United States Patent [19]
Kawano et al.

[11] Patent Number: 4,754,495
[45] Date of Patent: Jun. 28, 1988

[54] CELL ENHANCER FOR CELLULAR RADIO TELEPHONE SYSTEM HAVING BANDPASS FILTER ARRANGEMENT

[76] Inventors: Minori Kawano, 867 Leopard Trail, Winter Springs, Fla. 32708; Tomoji Ichinose, 1802 Landing Dr.-E., Sanford, Fla. 32771; Edward F. Weingart, R.D. #1, Box 346, Whispering Hills Dr., Annandale, N.J. 08801

[21] Appl. No.: 809,077

[22] Filed: Dec. 16, 1985

[51] Int. Cl.⁴ .......................... H04B 7/14; H04Q 7/00
[52] U.S. Cl. ....................................... 455/17; 455/16; 455/33
[58] Field of Search .................. 455/17, 23, 15, 16, 455/19, 14, 22, 33, 54; 370/24, 75

[56] References Cited

U.S. PATENT DOCUMENTS

| | | | |
|---|---|---|---|
| 3,028,489 | 4/1962 | Chasek | 455/16 |
| 3,411,088 | 11/1968 | Hutchison | 455/17 |
| 3,450,841 | 6/1969 | Zeiser et al. | 370/75 |
| 4,041,389 | 8/1977 | Oades | 455/23 |
| 4,198,600 | 4/1980 | Oguchi et al. | 455/15 |
| 4,317,216 | 2/1982 | Kaegebein | 455/16 |
| 4,475,243 | 10/1984 | Batlivala | 455/22 |

FOREIGN PATENT DOCUMENTS 60-55743  4/1985  Japan .............................. 179/170 HF

OTHER PUBLICATIONS

"The Cell Enhancer", Quinn, 1982, IEEE, pp. 77-79.
Anon, "2 GHz Repeater Built Without I-F", Jun. 1976, p. 16.
Oades, "The Linear RF Repeater", Jun. 1980, pp. 6.2.1-6.2.5.

Primary Examiner—Robert L. Griffin
Assistant Examiner—Curtis Kuntz
Attorney, Agent, or Firm—Cesari and McKenna

[57] ABSTRACT

A cell enhancer for use by one cellular provider in a cellular radio-telephone system includes a wideband amplifier for amplifying both down-link and up-link signals and a filter system for ensuring that signals outside of the cellular bands are not amplified. The filter system includes a wideband filter that passes at least the voice channels assigned to the cellular provider in the cell and a narrow band filter that passes the paging/access control channel in the cell. By using the filter system, signals outside the band assigned to the cellular provider, and particularly signals in the band assigned to the other cellular provider which may be present in the area, will not be amplified by the cell enhancer.

9 Claims, 4 Drawing Sheets

CELL ENHANCER FOR CELLULAR RADIO TELEPHONE SYSTEM HAVING BANDPASS FILTER ARRANGEMENT

BACKGROUND OF THE INVENTION

1. Field of the Invention

The invention relates generally to the field of amplifying devices for radio-frequency signals, and more specifically to amplifying systems for eliminating or overcoming dead spots in cellular radio-telephone systems caused by obstructions such as buildings or hills that block cellular radio-telephone signals in at least some portions of a cell.

2. Description of the Prior Art

Cellular radio-telephone systems have recently been introduced in a number of areas to provide telephone coverage for people who need to have access to telephones from outside of their offices or are otherwise unable to get to telephones that are hard-wired to a central office over conventional telephone lines.

In cellular radio-telephone systems, an area is divided into a plurality of small regions, or "cells", each of which is covered by a relatively low-power transmitter. Currently, cellular radio telephone service is provided in the 825 to 845 MHz and 870 to 890 MHz frequency bands. The higher freqency band is used for "down-link" transmissions from the "cell site" for reception by the subscriber. The "cell site" is the location of the transmitter, or, more specifically, the location of the antenna from which transmissions are effected for the cell. The lower frequency band is used for "up-link" transmissions from the subscriber in the cell for reception by the receiving equipment which is also located at the cell site.

Each frequency band assigned to the cellular radio telephone system is divided into two parts, with one part being reserved for the local telephone company and the other half being franchised to a competing service provider. Each channel has a thiry kilohertz bandwidth, allowing for 666 channels in each twenty megahertz band, with 333 being provided to the telephone company and the same number to the franchisee.

Since a cellular radio telephone system uses relatively low power and since the wavelengths of the signals are short, obstructions such as buildings and mountains which may be present between the cell site and a subscriber at various locations in a cell, can cause significant degradation in the signal levels, in some areas reducing them to unusable levels. Increasing the power of the signals may raise them to levels which are acceptable in those areas, but that could cause several problems. First, while adjacent cells do not use the same channels, at least some of the next closest cells will use the same channels, and raising power in some cells will cause interference in those other cells. Furthermore, raising the power of a signal in one channel may cause adjacent channel interference between channels in adjacent cells.

In any event, increasing power of the signal transmitted from a cell site will do nothing to enhance the signal the cell site receives from the subscriber. Indeed, the amount of power that a subscriber can transmit is limited at least by the capacity of battery, specifically in case of a portable telephone subscriber.

U.S. patent application Ser. No. 787,332 discloses several embodiments of a cell enhancer system having amplifiers in various configurations for receiving, amplifying and re-transmitting down-link signals from a cell site into an obstructed area, and also for receiving up-link signals from subscribers in the obstructed area, amplifying them and re-transmitting the amplified signals to the cell site. In one embodiment disclosed in that application, a single wide-band amplifier has an input terminal that receives both up- and down-link signals from antennas through a duplexer network, and that transfers through another duplexer network amplified up- and down-link signals to appropriate antennas for transmission. The wide-band amplifier amplifies all signals in at least the two cellular radio telephone bands.

Problems may arise with the above-described cell enhancer, since the enhancer amplifies signals in the ranges allocated to both the local telephone company and the franchisee. The actual area shielded by an obstruction depends upon the location of the cell site, and, since the telephone company and the franchisee may select different cell sites within a cell, the pattern of obstructed areas within a cell may differ as between the telephone company and franchisee. For example, an area that may be obstructed for the cell site of the franchisee may not be obstructed for the cell site of the telephone company. However, a cell enhancer as described above will transmit into the obstructed area down-link signals in the range for both the franchisee and the telephone company, which may interfere with direct signals from the telephone company's cell site.

SUMMARY OF THE INVENTION

The invention provides a new and improved apparatus for enhancing the level of a signal from either a cell site or a subscriber in areas in which obstructions otherwise reduce the signal levels and which has sufficient selectivity to amplify and re-transmit signals that are only in the frequency range assigned to either the local telephone company or the franchised service provider so as to avoid interference with signals in the other range.

In brief summary, the apparatus includes an "upstream" antenna system directed to the cell site for receiving the transmitted signal from the cell site and transmitting an amplified signal from a subscriber in the area of the cell otherwise obstructed to the cell site. A "downstream" antenna system is directed at the obstructed area of the cell for radiating an amplified signal from the cell site and for receiving signals from subscribers in the obstructed area. An amplifier system filters and amplifies signals in selected ranges received at each antenna system for radiation through the other antenna system. The amplifer system includes a filtering arrangement that includes a wideband filter that cuts off near the end of the frequency range so as to avoid interference with the other cellular service provider. To ensure that the channels at the end of the frequency range, and specifically a paging/access control channel, are also a second filter with a narrow bandwidth is provided. Both filters feed a wideband amplifier.

In one embodiment, the amplifier system comprises an amplifier path comprising two wide-band filters and at least two narrow-band filters which selectively amplifies the signals in the bands allocated to the telephone company or franchisee. One wide-band filter and one narrow band filter is provided for each of the up-link and down-link frequency ranges assigned to the respective cellular service provider. Each antenna system is connected to a duplexer, which couples signals from antenna system to the input/output of the amplifier path.

In a second embodiment, two amplifier systems are provided, one for the "up-link" signals and the second for the "down-link" signals. Each amplifier system includes the set of filters including the wideband filter and the narrow band filter, appropriate for the particular up-link and down-link frequency range.

BRIEF DESCRIPTION OF THE DRAWINGS

The invention is pointed out particularly in the appended claims. The above and further advantages of the invention will be better understood by referring to the following detailed description of an illustrative embodiment taken in conjunction with the accompanying drawings, in which:

DETAILED DESCRIPTION OF AN ILLUSTRATIVE EMBODIMENT

Figure 1:
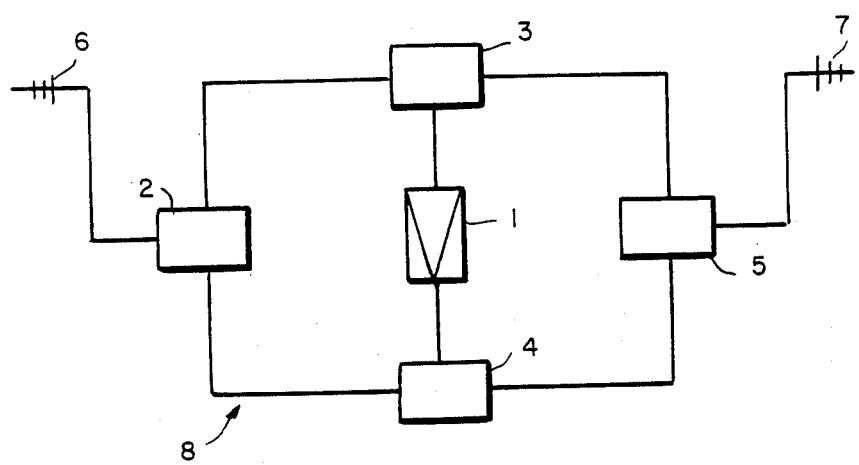
FIG. 1 is a block diagram of a prior art cell enhancer.

With reference to FIG. 1, which depicts a cell enhancer as described in the aforementioned U.S. patent application Ser. No. 787,332 a prior art cell enhancer includes an antenna system 6 which is directed at the cell site, a second antenna system 7 which is directed at the obstructed region, and an amplifier 8 which receives the signals from the cell site by way of antenna system 6, amplifies them, and transmits them into the shadow region through antenna system 7. In addition, the amplifier 8 receives signals from subscribers in the shadow region through antenna system 7, amplifies them and transmits them to the cell site through antenna system 6.

In the cell enhancer depicted in FIG. 1, the amplifier 8 is a single wideband amplifier that is capable of amplifying all frequencies in the two twenty-megahertz radio frequency bands allocated to cellular service, one band being for down-link transmissions from the cell site to the subscribers and the other band being for up-link transmissions from the subscribers to the cell site. A duplexer 2 connected to antenna system 6 receives radio frequency signals from the antenna system and passes those in the appropriate 870 to 890 m egahertz band to an input terminal of a second duplexer 3.

Duplexer 3 also has a second input terminal, which receives radio frequency signals from another duplexer 5, in one of the bands 825 to 845 megahertz, from antenna system 7 originating at a subscriber. Duplexer 3 couples the radio-frequency signals in the selected bands from both duplexers 2 and 5 to an input terminal of a wide-band amplifer 1.

After being amplified by the wideband amplifier 1, the signals are coupled to the input terminal of another duplexer 4. Duplexer 4 couples the portion of the signal in the 825 to 845 megahertz band to an input terminal of duplexer 2 which couples the signal to antenna system 6 for transmission to the cell site. The duplexer 4 also couples the portion of the signal from the wideband amplifier that is in the 870 to 890 megahertz band to an input terminal of duplexer 5, which couples the signal to antenna system 7 for transmission into the shadow area.

Figure 2:
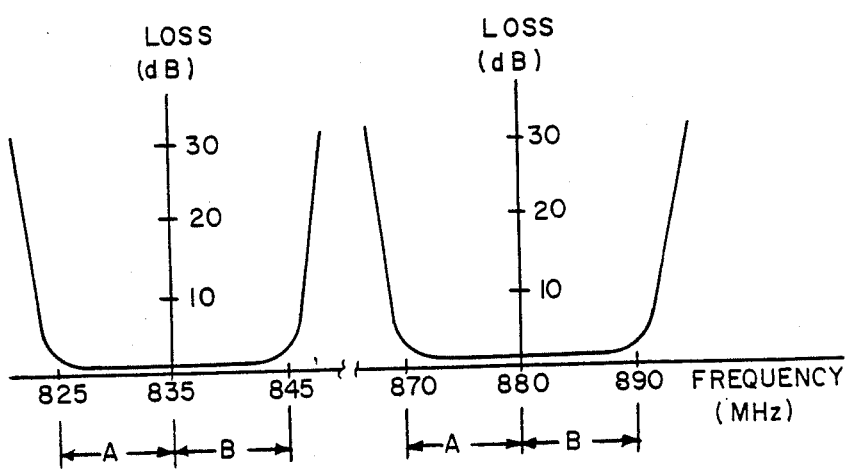
FIG. 2 is a graph illustrating the selectivity of the cell enhancer depicted in FIG. 1.

FIG. 2 is a graph which illustrates the selectivity provided by typical duplexers 2, 3, 4 and 5 in the 825 to 845 megahertz and 870 to 890 megahertz frequency bands. As is apparent from this graph, the cell enhancer depicted in FIG. 1 is unable to separate the frequency ranges assigned to the local telephone company and to the franchisee but instead will amplify all signals within both frequency ranges. However, signals in one of the ranges may not be obstructed in the area served by the cell enhancer, because of differing placements of the cell sites by the local telephone company and the franchisee, and so there may be interference between direct signals from that cell site and the signals from the cell enhancer in those ranges.

Figure 3:
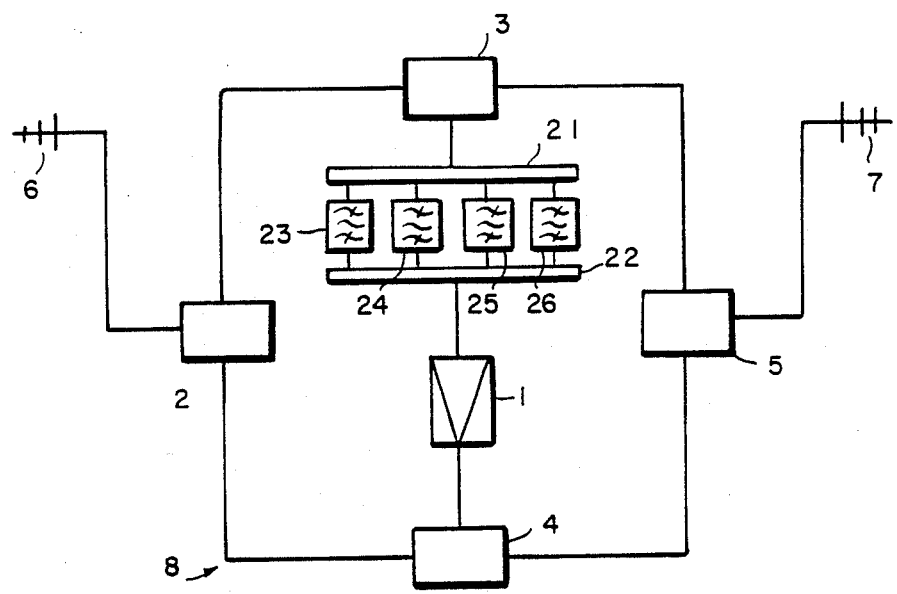
FIG. 3 is a block diagram of a cell enhancer constructed in accordance with the invention.
Figure 4:
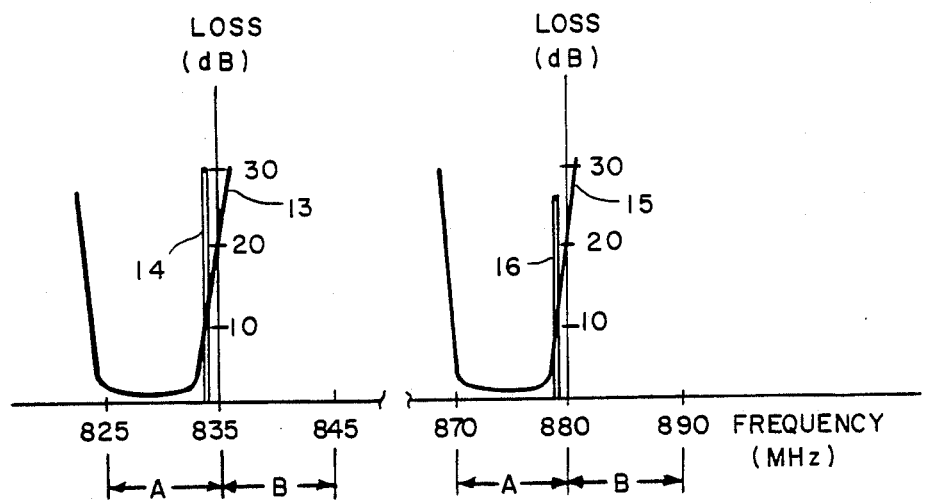
FIG. 4 is a graph illustrating the selectivity of the cell enhancer depicted in FIG. 3.

With reference to FIG. 3, a cell enhancer constructed in accordance with this invention includes a filter arrangment 20 comprising a plurality of selective filters 23–26. The elements of the circuit with reference numerals 1–7 are the same as the corresponding elements in FIG. 1. As depicted in FIG. 4, two of the filters, for example filters 23 and 25, are wide-band filters which pass the signals in most of the frequency range assigned to the cellular provider, either the local telephone company or the franchisee, which maintains the cell enhancer. These filters have band-pass filtering characteristics as depicted in curves 13 and 15 of FIG. 4. The wide band filters 23 and 25 cut off near the end of the frequency range that is adjacent to the range assigned to the other cellular provider. Thus, if the cellular provider maintaining the cell enhancer has assigned channels in, for example, the lower range of a band, the wide band filter will cut off near the high end of the range, thereby avoiding interference with the signals from the service provider in the upper range of the band. Similarly, if the cellular provider that maintains the cell enhancer is assigned to the upper range of the band, the wide band filter will cut off near the low end of the range.

The other filters 24 and 26 are narrow band filters which pass at least a portion of the frequency range which is cut off by the wide band filter. These filters 24 and 26 have band pass filtering characteristics as depicted in curves 14 and 16 of FIG. 4. For example, if the cell enhancer covers the lower range, the wide band filter will cut off the channels in the upper end of the range and the narrow band filters are provided to transfer at least some of the other channels in the range to the amplifier and thus permit the cell enhancer to also carry those channels. Similarly, the cell enhancer covers the upper range, the narrow band filters transfer the signals in the lower channels in the range to amplifier 1.

In one particular embodiment, the wide-band filters pass all of the voice channel frequencies and the narrow band filter passes the control channel frequencies that are used for paging/access control for the cell. The paging/access control channels are all near the center of the band and usually only a few of the control channels are used for a cell. If more than one control channel is used in a cell, a narrow band filter may be provided for each channel or alternatively, if the control channels in the cell are adjacent, the narrow band filter may have a sufficient bandwidth to pass all of them. In the embodiment depicted in FIG. 3, two wideband and two narrow band filters are provided to ensure coverage of the frequency ranges in both the up-link and the down-link bands used for the cellular service. One wideband filter and one narrow band filter are used for each cellular band.

Filters 23–26 are all connected to receive input signals from a multi-coupler 21, which in turn receives input signals from duplexer 3. The output signals from filters 23–26 are combined in a combiner 22 and coupled to the input terminal of amplifier 1.

Figure 7:
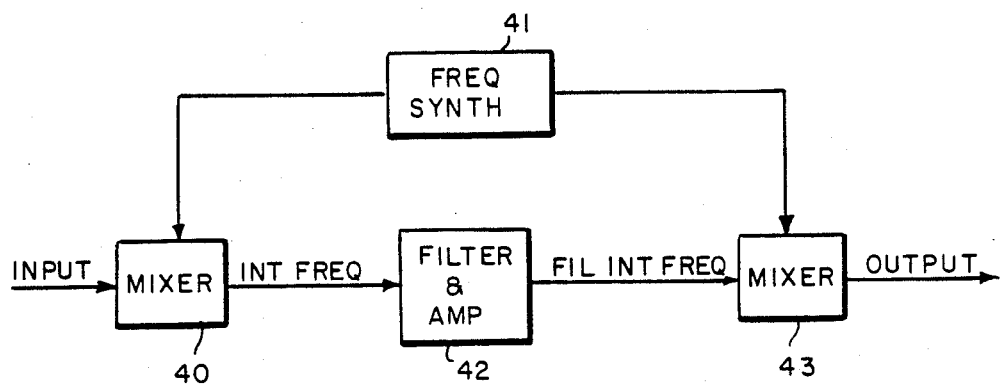
FIG. 7 is a block diagram of a filter useful in connnection with the invention.

The filters 23–26 can be any of a plurality of types of filters capable of providing the selectivity requirements as described above, and as graphically depicted in FIG. 4. One suitable filter is depicted in FIG. 7. With reference to FIG. 7, a mixer 40 receives an INPUT input signal from the multi-coupler 21 and heterodynes it with a signal from a frequency synthesizer 41 to form an INT FREQ intermediate frequency signal in a conventional manner. The INT FREQ intermediate frequency signal is coupled to a filter and amplifier 42 which generates an FIL INT FREQ filtered intermediate frequency signal. A second mixer 43 receives the FIL INT FREQ filtered intermediate frequency signal from the filter and amplifier 42 and heterodynes it in a conventional manner with a signal from the frequency synthesizer 41 to provide an OUTPUT output signal.

FIG. 4 depicts graphs of the desired selectivities of the filters of a cell enhancer as depicted in FIG. 3, for the lower ranges of the 825–845 MHZ and 870–890 MHZ cellular bands. The selectivities of the wide-band filters 23 and 25 are indicated by graphs 13 and 15, and the selectivities of the narrow-band filters 24 and 26 are indicated by graphs 14 and 16. Preferably each wide band filter has approximately a nine megahertz band pass, and each narrow-band filter has a thirty kilohertz band pass and centered over a paging/access control channel. The combination of the two filters in each of the up- and down-link frequency ranges is sufficient to pass the signals required in the frequency range and to minimize interference from signals in the other range. Specifically, the wide-band filter passes primarily the voice channels of the cellular system, and the narrow-band filter passes a paging/access channel for the cell site.

Figure 5:
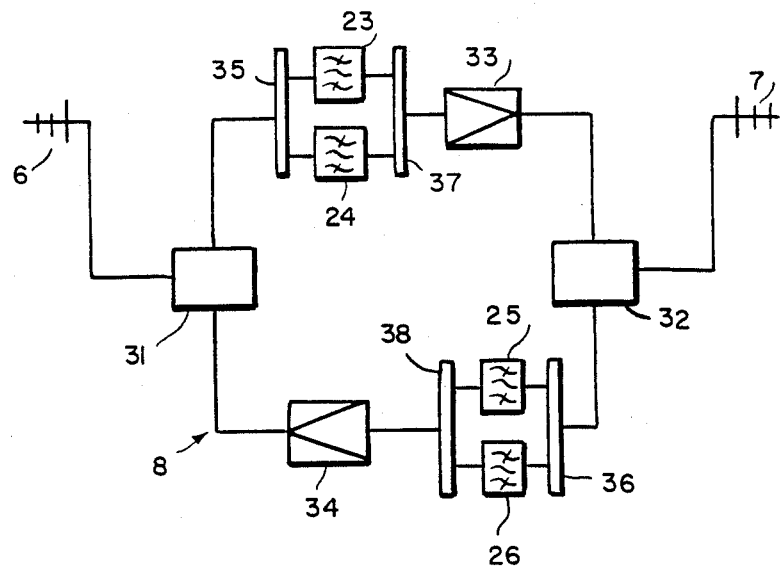
FIG. 5 is a block diagram of a second embodiment of the invention.

With reference to FIG. 5, a second embodiment of a cell enhancer includes amplifiers 33 and 34 each of which has a 20 megahertz band pass and is suitable for amplifying in the respective up- and down-link frequency bands that are allocated for cellular radio-telephone. An amplifier 33 amplifies the down-link, and an amplifier 34 amplifies the up-link signals. The cell enhancer also includes a plurality of selective filters 23 through 26, each of which has the selectivity described above for FIG. 4. Thus, the narrow band filters 24 and 26 selects the 30 kilohertz paging/access channel and the wideband filters 23 and 25 pass the nine megahertz voice channel band, and suppress the remaining twenty megahertz bandwidth is allocated for cellular radiotelephone.

Filters 23 and 24 receive signals from multicoupler 35 and transmit signals to combiner 37. Filters 25 and 26 receive signals from multicoupler 36 and transmit signals to combiner 38.

The cell enhancer depicted in FIG. 5 also includes an antenna system 6 for receiving signals from and transmitting signals to a cell site and an antenna system 7 for receiving signals from and transmitting signals to subscribers in the obstructed area. Antenna system 6 delivers signals in the appropriate 870 to 890 megahertz band to an input terminal of multicoupler 35 through duplexer 31. Multicoupler 35 has a output terminal connected to an input terminal of each filter 23 and 24. The functions and characteristics of the filters 23–26 are the same as in the embodiment depicted in FIG. 3. The output signals from each filter are coupled to combiner 37 and then coupled to wideband amplifier 33 provided for the down-link. Antenna system 7 delivers signals in the appropriate 825 to 845 megahertz band to an input terminal of a multicoupler 36 through duplexer 32. Multicoupler 36 has the same arrangement with multicoupler 35, then similar selectivity is provided for the up-link.

Figure 6:
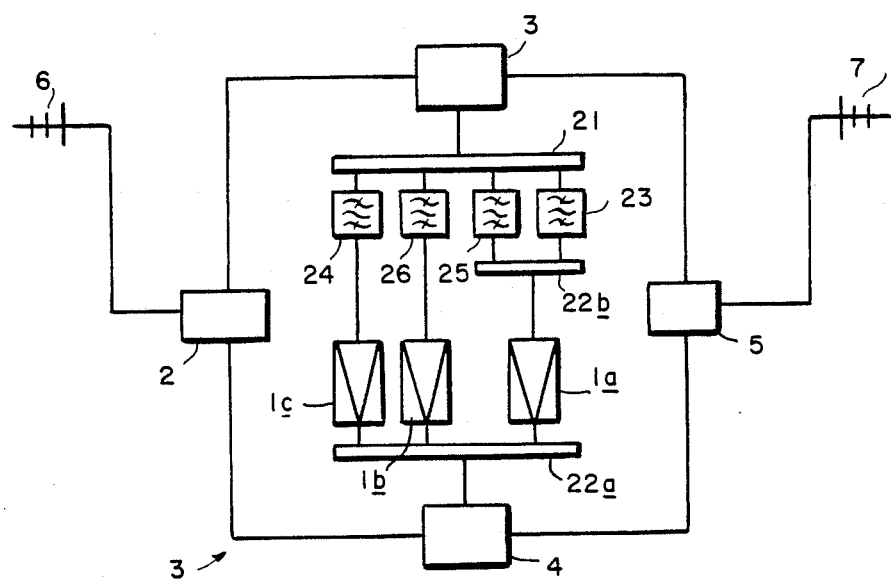
FIG. 6 is a block diagram of a third embodiment of the invention.

With reference to FIG. 6, a third embodiment of a cell enhancer including three amplifiers 1a, 1b and 1c, and two combiners 22a with combiner 22b for receiving the output signals from wideband amplifiers 23 and 25. The combiner 22b feeds amplifier 1A, and the narrow band filters 24 and 26 feed amplifiers 1b and 1c directly. The output signals from all of amplifiers 1a, 1b and 1c are combined in a combiner 22a and the resulting signal is coupled to duplexer 4.

The amplifiers 1b and 1c are connected to the narrow-band filters to amplify the paging and access control channel signals selected by the filter 24 and 26. Otherwise, the cell enhancer depicted in FIG. 6 operates in the same way as the enhancer depicted in FIG. 2.

The foregoing description is limited to a specific embodiment of this invention. It will be apparent, however, that this invention can be practiced in systems having diverse basic construction or that use different internal circuitry than is described in the specifications with some or all of the foregoing advantages. Therefore, it is the object of the appended claims to cover all such variations and modifications which come within the true spirit and scope of this invention.

What is claimed as new and desired to be secured by Letters Patent of the United States is:

1. For use in a cellular radio telephone system, a cell enhancer for enhancing duplex communications between a cell site and a subscriber over diverse radio frequency channels, at least some of said channels being used for voice signals and other channels being used for control information signals for controlling the operation of said system, said cell enhancer comprising:
   A. communications means for receiving signals from and transmitting signals to the cell site over said radio frequency channels and for receiving signals from and transmitting signals to the subscriber over said radio frequency channels, said communications means including:
      i. cell site antenna means for converting signals from the cell site between electromagnetic signals and electrical signals;
      ii. subscriber antenna means for converting signals from the subscriber between electromagnetic signals and electrical signals;
      iii. input duplex means for receiving the electrical signals from the cell site antenna means and said subscriber means and directing them to a common duplex output terminal; and
      iv. output duplex means for receiving electrical signals from a duplex input terminal and coupling them to appropriate cell site antenna means or subscriber antenna means for transmission to said cell site or subscriber;
   B. duplex filter means including a narrow band filter module means for passing a signal in a channel which carries control information signals and a wide band filter means for passing a signal in a plurality of channels which carry voice signals, said duplex filter means further including:

i. multicoupler means conected to said common output terminal and to the inputs of each of said filter module means for receiving the signals from said input duplex means and coupling them to each of said filter module means; and ii. combining means connected to the outputs of each of said filter module means and said duplex input terminal for combining the output signals from all of said filter module means into a single output signal coupled to said duplex input terminal.

2. A cell enhancer as defined in claim 1 wherein each filter module means comprises:

A. frequency synthesizing means for generating a signal of a preselected frequency;

B. intermediate frequency signal generating means connected to said frequency synthesizing means and to the output of said multicoupler means for generating an intermediate frequency signal in response to the signals from the multicoupler means and the frequency synthesizing means;

C. filter means connected to the output of said intermediate frequency signal generating means for performing a filtering operation to provide an output signal having a predetermined intermediate frequency; and D. radio frequency signal generating means connected to the output of said filter means and said frequency synthesizing means for generating an output signal for transmission to the combining means in response to the output signal from said filter means and the signal from said frequency synthesizing means.

3. A cell enhancer as defined in claim 1 further comprising amplification means connected between the output of said combining means and the input of said output duplex means for amplifying the signal coupled thereto to provide an amplified signal to said output duplex means.

4. A cell enchancer as defined in claim 1 wherein said narrow band filter means includes a narrow band up-link band-pass filter, a narrow band down-link band-pass filter, a wide band up-link band-pass filter and a wide band down-link band-pass filter all connected between said multicoupler means and said combining means, said narrow band up-link band-pass filter and said narrow band down-link band-pass filter passing said control information signals and said wide band up-link band-pass filter and said wide band down-link band-pass filter passing said voice signals.

5. A cell enhancer as defined in claim 1 further comprising amplification means connected between the output of a filter module means and said combining means for amplifying the output of the filter module means to which it is connected.

6. A cell enhancer as defined in claim 1 further comprising amplifying means connected to the outputs of selected filter module means, the outputs of other filter module means being connected to an intermediate combining means for combining the output signals from those filter module means and coupling the combined output signals to another amplifying means, the output of said other amplifying means being coupled to said combining means.

7. For use in a cellular radio telephone system, a cell enhancer for enhancing duplex communications between a cell site and a subscriber over diverse radio frequency channels, at least some of said channels being used for voice signals and other channels being used for control information signals for controlling the operation of said system, said cell enhancer comprising:

A. communications means for receiving signals from and transmitting signals to the cell site over said radio frequency channels and for receiving signals from and transmitting signals to the subscriber over said radio frequency channels, said communications means including:

i. cell site communications means for converting signals from the cell site between electromagnetic signals and electrical signals;

ii. subscriber communications means for converting signals from the subscriber between electromagnetic signals and electrical signals;

B. duplex filter means including a narrow band up-link band-pass filter and a narrow band down-link band-pass filter both for passing signals in a channel which carries control information signals and a wide band up-link band-pass filter and a wide band down-link band-pass filter both for passing signals in a plurality of channels which carry voice signals, said duplex filter means further including:

i. multicoupler means including:

(a) up-link multicoupler means connected to said subscriber communications means, said narrow band up-link band-pass filter and said wide band up-link band-pass filter for coupling signals from said subscriber communications means to both said narrow band up-link band-pass filter and said wide band up-link band-pass filter;

(b) down-link multicoupler means connected to said cell site communications means, said narrow band down-link band-pass filter and said wide band down-link band-pass filter for coupling signals from said cell site communications means to both said narrow band down-link band-pass filter and said wide band down-link band-pass fiter;

ii. combining means including:

(a) up-link combining means connected to said cell site communications means, said narrow band up-link band-pass filter and said wide band up-link band-pass filter for combining the output signals from said narrow band up-link band-pass filter and said wide band up-link band-pass filter for coupling to said cell site communications means; and (b) down-link combining means connected to said subscriber communications means, said narrow band down-link band-pass filter and said wide band down-link band-pass filter for combining the output signals from said narrow band down-link band-pass filter and said wide band down-link band-pass filter for coupling to said subscriber communications means.

8. A cell enhancer as defined in claim 7 wherein each filter module means comprises:

A. frequency synthesizing means for generating a signal of a preselected frequency;

B. intermediate frequency signal generating means connected to said frequency synthesizing means and to the output of said multicoupler means for generating an intermediate frequency signal in response to the signals from the multicoupler means and the frequency synthesizing means;

C. filter means connected to the output of said intermediate frequency signal generating means for performing a filtering operation to provide an output signal having a predetermined intermediate frequency; and D. radio frequency signal generating means connected to the output of said filter means and said frequency synthesizing means for generating an output signal for transmission to the combining means in response to the output signal from said filter means and the signal from said frequency synthesizing means.

9. A cell enchancer as defined in claim 7 further comprising up-link amplification means connected between the output of said up-link combining means and said cell site communications means for amplifying signals from said up-link combining means for coupling to said cell site communications means, and down-link amplificaiton means connected between the output of said down-link combining means and said subscriber communications means for amplifying signals from said down-link combining means for coupling to said subscriber communications means.

* * * * *